(12) United States Patent
Chirila et al.

(10) Patent No.: US 12,024,312 B2
(45) Date of Patent: Jul. 2, 2024

(54) REWORK PART FOR COMPOSITE STRUCTURE

(71) Applicant: The Boeing Company, Chicago, IL (US)

(72) Inventors: Cezar Chirila, Sunset Beach, CA (US); Remmelt Andrew Staal, Huntington Beach, CA (US); Justin H. Register, Charleston, SC (US); Gregory J. Smith, Philipsburg, MT (US)

(73) Assignee: The Boeing Company, Arlington, VA (US)

( * ) Notice: Subject to any disclaimer, the term of this patent is extended or adjusted under 35 U.S.C. 154(b) by 134 days.

(21) Appl. No.: 17/455,151

(22) Filed: Nov. 16, 2021

(65) Prior Publication Data

US 2022/0169403 A1 Jun. 2, 2022

Related U.S. Application Data

(60) Provisional application No. 63/120,110, filed on Dec. 1, 2020.

(51) Int. Cl.
| | |
|---|---|
| *B64F 5/40* | (2017.01) |
| *B29C 73/10* | (2006.01) |
| *B29L 31/30* | (2006.01) |

(52) U.S. Cl.
CPC ............... *B64F 5/40* (2017.01); *B29C 73/10* (2013.01); *B29L 2031/3076* (2013.01)

(58) Field of Classification Search
CPC ..... B64F 5/40; B29C 73/10; B29L 2031/3076
See application file for complete search history.

(56) References Cited

U.S. PATENT DOCUMENTS

| | | |
|---|---|---|
| 5,269,861 A | 12/1993 | Gilbreath |
| 5,882,756 A | 3/1999 | Alston et al. |
| 5,958,166 A | 9/1999 | Walters et al. |

(Continued)

FOREIGN PATENT DOCUMENTS

| | | | | |
|---|---|---|---|---|
| AU | 2020204380 A1 | * | 6/2021 | ............ B22F 3/1115 |
| WO | 2016118449 A1 | | 7/2016 | |

(Continued)

OTHER PUBLICATIONS

European Patent Office, Extended European Search Report Issued in Application No. 18170982.5, Nov. 21, 2018, Germany, 8 pages.

(Continued)

*Primary Examiner* — Jason L Vaughan
(74) *Attorney, Agent, or Firm* — Alleman Hall & Tuttle LLP

(57) ABSTRACT

A rework part for a composite structure is described. The rework part comprises an upper composite layer comprising an upper perimeter that extends beyond a damaged area of the composite structure, and a bottom composite layer between the composite structure and the upper composite layer, the bottom composite layer comprising a bottom perimeter that extends beyond the upper perimeter of the upper composite layer. The rework part further comprises a bottom adhesive layer adhering the bottom composite layer to the composite structure, and a rework part adhesive layer bonding the upper composite layer to either the bottom composite layer or to an intermediate composite layer.

20 Claims, 9 Drawing Sheets

(56) References Cited

U.S. PATENT DOCUMENTS

| | | | |
|---|---|---|---|
| 5,972,141 | A | 10/1999 | Ellyin |
| 7,870,005 | B2 | 1/2011 | Arbogast et al. |
| 8,468,709 | B2 | 6/2013 | Akdeniz et al. |
| 8,617,694 | B1 | 12/2013 | Dan-Jumbo et al. |
| 8,828,515 | B2 | 9/2014 | Dan-Jumbo et al. |
| 9,314,979 | B1* | 4/2016 | Dan-Jumbo ............ B29C 73/10 |
| 9,492,975 | B2 | 11/2016 | Dan-Jumbo |
| 10,710,352 | B2* | 7/2020 | Bertrand ................. B32B 43/00 |
| 2010/0233424 | A1 | 9/2010 | Dan-Jumbo et al. |
| 2013/0294644 | A1 | 11/2013 | Cork et al. |
| 2014/0017037 | A1 | 1/2014 | Plokker |
| 2014/0119813 | A1 | 5/2014 | Moselage, III |
| 2014/0238579 | A1* | 8/2014 | Dan-Jumbo .............. B64F 5/40 156/94 |
| 2014/0295124 | A1 | 10/2014 | Suhara et al. |
| 2014/0326389 | A1 | 11/2014 | Blanchard et al. |
| 2015/0090392 | A1 | 4/2015 | Bertrand et al. |
| 2015/0099411 | A1 | 4/2015 | Yang et al. |
| 2015/0251401 | A1 | 9/2015 | Ackerman et al. |
| 2016/0159057 | A1 | 6/2016 | Butler |
| 2016/0214328 | A1 | 7/2016 | MacAdams et al. |
| 2017/0008184 | A1 | 1/2017 | Tomblin et al. |
| 2017/0113425 | A1* | 4/2017 | Tardu ....................... B32B 5/06 |
| 2018/0036973 | A1 | 2/2018 | Dew et al. |
| 2018/0094525 | A1 | 4/2018 | Roberts et al. |
| 2019/0099959 | A1 | 4/2019 | Staal et al. |
| 2019/0168481 | A1 | 6/2019 | Butler |
| 2020/0398504 | A1 | 12/2020 | Register et al. |

FOREIGN PATENT DOCUMENTS

| | | |
|---|---|---|
| WO | 2016137565 A1 | 9/2016 |
| WO | 2020054220 A1 | 3/2020 |

OTHER PUBLICATIONS

European Patent Office, Extended European Search Report Issued in Application No. 18193985.1, Feb. 27, 2019, Germany, 9 pages.

Patent Office of the Cooperation Council for the Arab States of the Gulf, Examination Report Issued in Application No. GC 2018-35576, May 14, 2020, 5 pages.

"How to Repair Drywall," Youtube Website, Available Online at https://www.youtube.com/watch?v=Fdy9uRvpl-E, Mar. 23, 2015, 3 pages.

European Patent Office, Extended European Search Report Issued in Application No. 21208435.4, Apr. 20, 2022, Germany, 5 pages.

* cited by examiner

REWORK PART FOR COMPOSITE STRUCTURE

CROSS REFERENCE TO RELATED APPLICATIONS

This application claims priority to U.S. Provisional Patent Application Ser. No. 63/120,110, filed Dec. 1, 2020, the entirety of which is hereby incorporated herein by reference for all purposes.

FIELD

The application relates to composite structures, and more particularly to a rework part for a damaged composite structure.

BACKGROUND

Structures and materials formed of resin-impregnated polymer composites (referred to herein as "composites", "composite layers" or "composite structures") are used in a variety of industries and products, including but not limited to aircraft and aerospace vehicles, land-based vehicle bodies, marine vessels, shipping containers, refrigeration panels, structural partitions and panels, and interior structures of an assembly. For example, aircraft may utilize composite structures in components such as wings, fuselages, stabilizers, engine housings, control surfaces, thrust deflector components, etc. Other applications for composite structures interior to an aircraft can include overhead storage bins, passenger storage racks, floor panels, and bulkhead panels.

Composite structures can sustain damage in a variety of circumstances. For example, in the course of operation an aircraft can sustain damage to its exterior and/or interior. Collisions between the aircraft and another object, such as other vehicles moving near the aircraft, debris or bird strikes, etc., as well as lightning strikes, are among the potential causes for exterior and/or damage. In some examples, exterior damage can be sustained in skin forming the exterior surface of the aircraft, and can potentially propagate to structures underlying the skin such as components of an airframe. An aircraft structure can also incur damage at times other than aircraft operation, such as during handling or installation of the structure.

Various approaches for reworking damaged aircraft structures have been developed, some of which are based on the material composition of the aircraft structures involved. For example, a bonded rework such as a scarf rework can be used to rework composite structures comprised of composite materials. In this approach, a damaged portion of a composite structure is removed, and a patch of rework material is bonded to the surface exposed by the removal of the damaged portion. Bonded reworks, however, can be time-consuming and thereby impose significant time delays between the occurrence of damage and its repair. Further, the removal of material from a damaged composite structure can increase the risk of further damage to the structure, and the bonding of rework material can require multiple heat cycles that can also cause damage if improperly applied.

Various configurations of rework material have been developed for damaged composite structures. According to one configuration, a patch of rework material includes two or more layers of composite material that are bonded together via an adhesive. Each layer comprises two plies of composite material, such as a resin-impregnated carbon composite material. A first layer having a smallest surface area is adhered to the surface of the damaged composite structure. Additional layers of increasingly greater area are then successively stacked on and draped over one another to form a multi-layered patch of rework material having a desired thickness. In this configuration, the first layer adhered to the structure has the smallest area, and each subsequent layer in the stack has a greater area that drapes over all underlying layers, with the uppermost layer covering all underlying layers.

The geometric nature of this configuration is such that each layer aside from the lowest layer drapes over all of the underlying layers to form a seal over and around these layers. As a result, volatiles, air, and/or other substances in the composite plies of the underlying layers, whose release from the rework part is desirable, can instead become trapped inside the fully-formed patch. Such trapped substances can negatively impact the functionality, durability and useful life of the patch. In some cases one or more breather holes are drilled into the patch to release these trapped substances. However, such holes reduce the structural integrity of the patch and increase the potential for degradation of the rework part.

Thus, and in view of the above, challenges exist in reworking damaged composite structures.

SUMMARY

To address the above issues, according to one aspect of the present disclosure, a rework part for a composite structure is provided. In this aspect, the rework part comprises an upper composite layer comprising an upper perimeter that extends beyond a damaged area of the composite structure, and a bottom composite layer between the composite structure and the upper composite layer, with the bottom composite layer comprising a bottom perimeter that extends beyond the upper perimeter of the upper composite layer. The rework part further comprises a bottom adhesive layer adhering the bottom composite layer to the composite structure, and a rework part adhesive layer bonding the upper composite layer to either the bottom composite layer or to an intermediate composite layer.

Another aspect of the present disclosure relates to a method for providing a rework part for a composite structure. In this aspect, the method comprises arranging an upper composite layer such that an upper perimeter of the upper composite layer extends beyond a damaged area of the composite structure, and arranging a bottom composite layer between the composite structure and the upper composite layer, the bottom composite layer comprising a bottom perimeter that extends beyond the upper perimeter of the upper composite layer. The method further comprises affixing the bottom composite layer to the composite structure, and bonding the upper composite layer to the bottom composite layer either directly through a rework part adhesive layer or indirectly through the rework part adhesive layer and one or more additional composite layers.

Another aspect of the present disclosure relates to a rework part for a composite structure. In this aspect, the rework part comprises an upper composite layer comprising an upper perimeter that extends beyond a damaged area of the composite structure, and a bottom composite layer between the damaged composite structure and the upper composite layer, with the bottom composite layer adhered to the composite structure and comprising a bottom perimeter that extends beyond the upper perimeter of the upper composite layer. The rework part further comprises an intermediate composite layer between the upper composite layer and the bottom composite layer, wherein the intermediate composite layer has an intermediate perimeter that extends beyond the upper perimeter of the upper composite layer and does not extend beyond the bottom perimeter of the bottom composite layer.

The features, functions, and advantages that have been discussed can be achieved independently in various embodiments or can be combined in yet other embodiments, further details of which can be seen with reference to the following description and drawings.

DETAILED DESCRIPTION

In view of the considerations discussed above, parts and methods are provided that relate to reworking damaged composite structures. Briefly, a rework part for a damaged composite structure includes a bottom composite layer and an upper composite layer. The bottom composite layer has a bottom perimeter that extends beyond an upper perimeter of the upper composite layer. The upper perimeter of the upper composite layer extends beyond a damaged area of the composite structure. A bottom adhesive layer adheres the bottom composite layer to the composite structure, and a rework part adhesive layer bonds the upper composite layer to either the bottom composite layer or to an intermediate composite layer. Additional intermediate composite layers can be provided to achieve a desired profile of the rework part. The layers of the rework part can then be bonded to form an assembly that is adhered to the damaged composite structure, for example through the application of heat and/or pressure.

In this arrangement, composite layers of decreasing area are successively stacked to form the rework part. The geometry of this arrangement is such that composite layers located further from the damaged structure do not drape over underlying layers closer to the structure, and as such each layer has an exposed perimeter portion through which air, volatiles, and/or other substances in the rework part can aspirate. Further, with this configuration the rework part can be adhered to the damaged composite structure without removing the damaged portion of the composite structure, and by using low-temperature adhesives, both of which reduce the potential for further damage to the damaged composite structure when applying the rework part.

Figure 1:
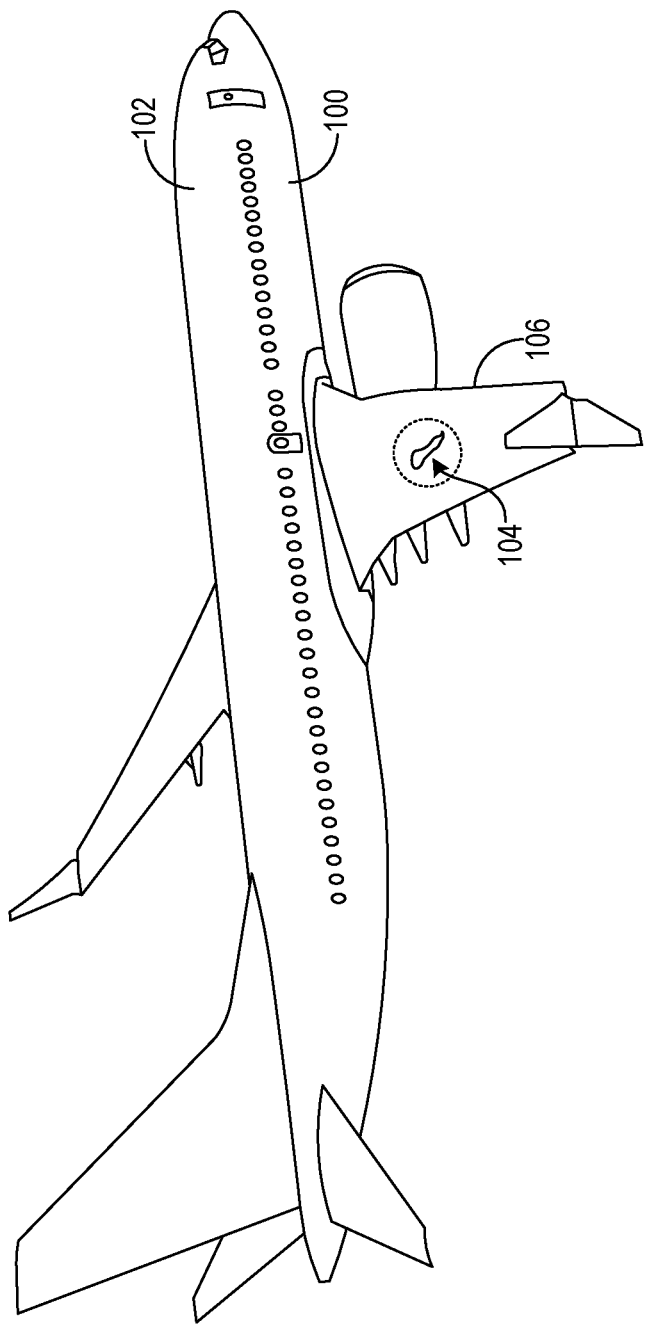
FIG. 1 shows an illustration depicting an example aircraft that includes one or more composite structures.

FIG. 1 illustrates an example aircraft 100 that includes one or more composite structures. Any suitable structures of aircraft 100 can be a composite structure, including but not limited to skin 102 forming the exterior surface of the aircraft 100, and/or components of an airframe underlying the skin 102, such as a wing, stringer, sandwich panel, stabilizer, and/or empennage. In the depicted example, skin 102 is formed from a composite material and has sustained damage 104 at a location where the skin 102 is overlaid on a right wing 106 of aircraft 100. Damage 104 may have resulted from a collision between aircraft 100 and another object, a lightning strike, or a variety of other circumstances.

An example of a rework part configured to rework damage 104 and restore the mechanical structure of skin 102 in the area of the damage is described below. In the present disclosure, aircraft 100 is provided as one example of an apparatus having composite structure(s) that can be reworked using the rework parts disclosed herein. Accordingly, the rework parts and methods of the present disclosure can be used to rework any suitable composite structure in any suitable apparatus. As further examples, the disclosed rework parts can be used to rework composite components of light aircraft, large aircraft, powered aircraft, unpowered aircraft, airplanes, airships, helicopters, spacecraft, seacraft, piloted vehicles, unpiloted vehicles, and/or any other suitable vehicle. The disclosed rework parts can be used to rework composite components of a stationary apparatus, including but not limited to buildings, dwellings, containers, etc.

Figure 2:
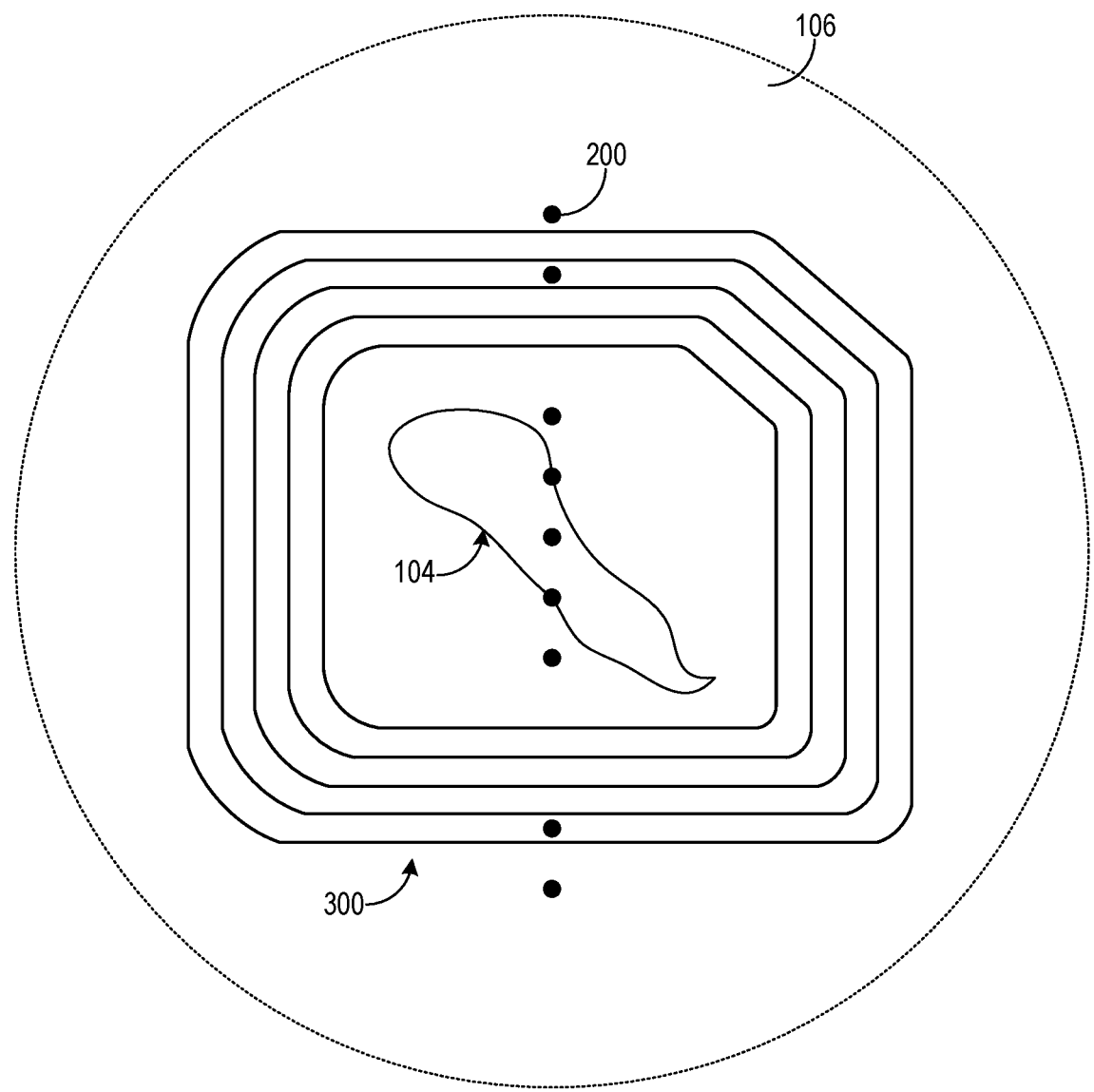
FIG. 2 shows an illustration depicting a damaged portion of a wing of the aircraft of FIG. 1.

FIG. 2 illustrates an enlarged view of damage 104 in wing 106, including an outline 300 superimposed on the wing for planning a rework part as described further below. The depicted example is illustrated with reference to a magnified portion of right wing 106, as can be seen by rivets (e.g., rivet 200) spanning the magnified portion. In some examples the damage 104 is analyzed to determine an extent of the damage and to map a profile for the rework part.

Analysis of the damage can take any suitable form. For example, the analysis can include measuring an area of damage 104—e.g., a two-dimensional extent of the damage 104 across the exterior surface of aircraft 100. The analysis can further include measuring the depth of damage 104—e.g., the distance that the damage extends in a direction substantially normal to the exterior surface of aircraft 100. Any suitable techniques can be used to determine the extent of damage 104, including but not limited to structural analysis techniques, X-ray, thermography and other imaging techniques, and tomographic techniques.

Based on the analysis of damage 104 and the material properties of skin 102 and rework parts as disclosed herein, a configuration for a rework part suitable to restore the structural capability and function of skin 102 can be determined. In different examples, such a rework part can have a number N of pre-cured composite layers that are sufficient to rework the damage 104, where N is an integer greater than or equal to two. As described in more detail below, in some examples each composite layer of a rework part is composed of two plies of composite material cured together. In other examples, each composite layer of a rework part is composed of three or more plies of composite material cured together.

As one example, where the skin 102 comprises a composite laminate that includes a plurality of composite plies or lamina, damage 104 may be present in 6 successive plies of the skin. In this example, and where each composite layer of a rework part contains two plies of composite material, analysis of the damage 104 is used to determine that a rework part comprising 3 composite layers (6 plies) is sufficient to restore the structural capability and function of the skin 102. In other examples, the total number of plies in a rework part can be different from the number of damaged plies in a damaged composite structure.

In another example, the configuration of a rework part can be determined based at least in part on an aircraft structure that is to be removed in order to access and rework an underlying damaged composite structure. In such examples, the underlying damaged composite structure can have access limitations—for example, access to damage can be limited to a single surface or side, and disassembly of the part to expose a damaged surface can pose an undesirable risk of further damage to the part. As one particular example, damage can occur in a stringer underlying an aircraft skin. To access and rework the stringer, the overlying skin can be removed, and a rework part can be adhered to the stringer. In some examples, the rework part is configured with a number of composite plies equal to the number of composite plies in the overlying skin.

As yet another example, a portion of skin that has become disbonded from an underlying stringer can be removed and replaced with a rework part adhered to the stringer. In some of these examples, the number of plies in the rework part is equal to the number of plies in the skin. In these examples, by matching the number of rework part composite plies to the number of plies in the skin, the exterior surface of the rework part may be substantially flush with surrounding portions of unremoved skin, thereby providing a rework part with desired aesthetic properties.

Figure 3:
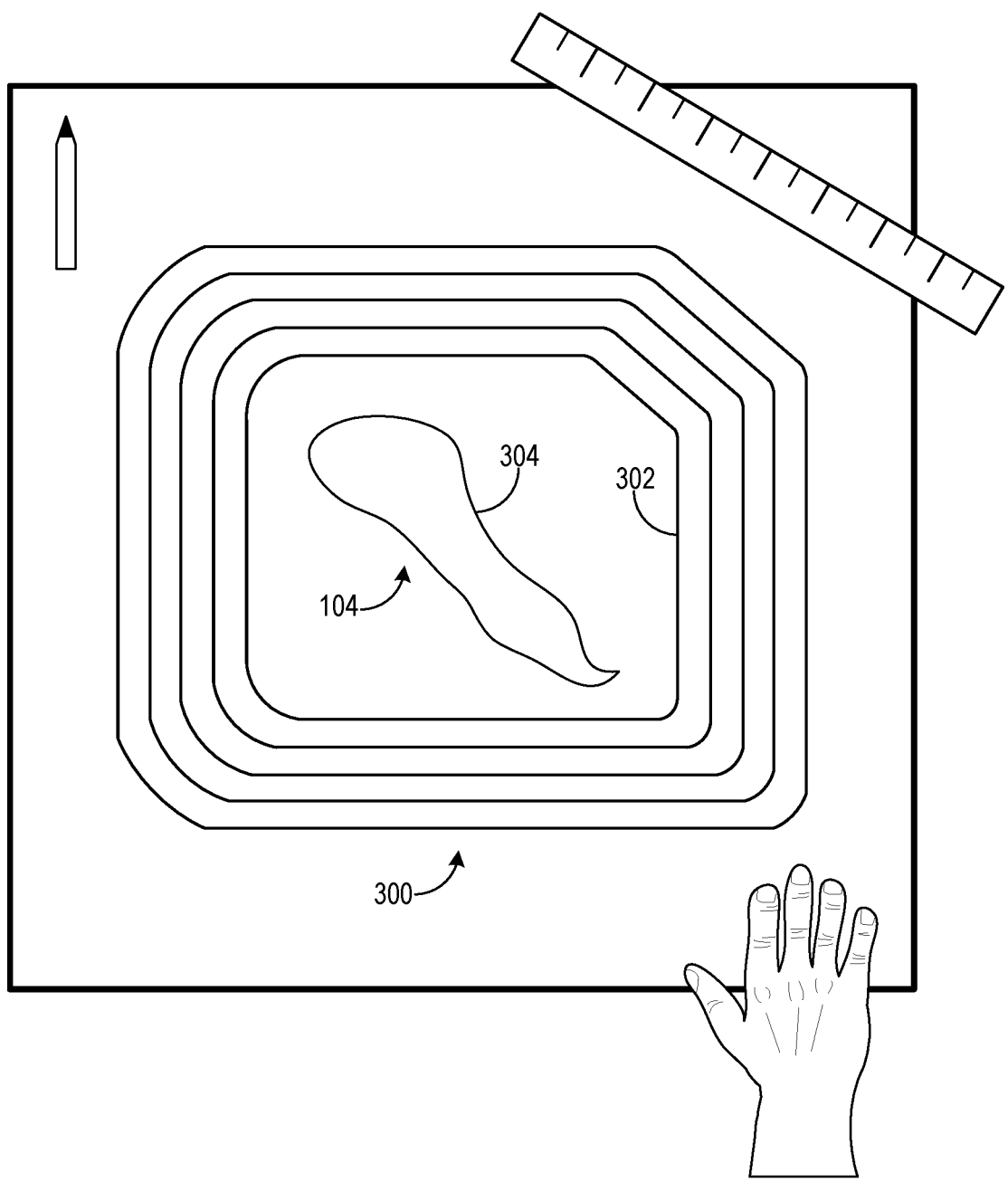
FIG. 3 shows an illustration depicting an example of planning a rework part configured to rework the damage illustrated in FIG. 2.

FIG. 3 illustrates an example of planning for a rework part configured to rework damage 104 based on analysis of the damage. In this example, various dimensional aspects of the rework part are determined to produce an outline 300 of the rework part and its individual composite layers. While in this example the dimensioning process is depicted as being performed on a workbench, dimensioning can be performed in any suitable manner including but not limited to on a computing device.

In this example, the dimensioning includes sizing and shaping the rework part such that a perimeter 302 of an uppermost composite layer of the rework part extends beyond the area of damage 104 as shown. More particularly, perimeter 302 of the uppermost composite layer extends beyond a perimeter 304 of damage 104 around the entire extent of the perimeter 304. In some examples, this extension beyond the perimeter of the damage is greater than or equal to a predetermined distance, as described below.

As noted above, the damaged area and its perimeter can be analyzed using any suitable inspection, structural analysis and/or imaging techniques. The dimensioning process illustrated in the depicted example also includes arranging the composite layers such that a given layer, aside from the uppermost composite layer, has a perimeter that extends beyond the perimeter of the adjacent layer above the given layer. In some examples, this extension of each composite layer perimeter beyond its upper adjacent neighbor layer perimeter is greater than or equal to another predetermined distance, as described below. In some examples, pre-cured composite layers can be fabricated in preconfigured shapes, such as 24"×24" or 36"×36", and then trimmed to a desired perimeter shape. In other examples, pre-cured composite layers can be fabricated (and potentially post-processed) to achieve any suitable shape and dimensions.

Returning briefly to FIG. 2, outline 300 is shown superimposed on the magnified portion of right wing 106 of aircraft 100. In some examples, outline 300 can be superimposed to provide a visual aid for accurately placing and adhering a rework part to the right wing 106 and thereby reworking damage 104. Outline 300 can be superimposed on right wing 106 via any suitable mechanism, such as by printing the outline on the right wing 106, projecting the outline onto the right wing 106 via a projective display, or by a human operator drawing the outline on the right wing. Further, outline 300 can be represented by data of a computer-readable format (e.g., a computer-aided design (CAD) file), which can be used to form, cure, bond, analyze, and/or perform any other suitable action with respect to the rework part.

With the dimensions and composition of the rework part determined, the rework part can be formed and adhered to aircraft 100 to thereby rework damage 104. Example processes for forming and adhering rework parts to damaged composite structures are described below. Briefly, one example process includes nesting adhesive layers between composite layers of the rework part, bonding the adhesive and composite layers together, and adhering the rework part to a damaged composite structure. As described below, in some examples the bonding and adhering stages can be implemented in separate steps, where an intermediate tooling surface can be used to bond the layers of the rework part. In other examples, the bonding and adhering stages can be implemented in a common step using an aircraft or other apparatus including the damaged composite structure as a bonding and adhering surface.

Figure 4:
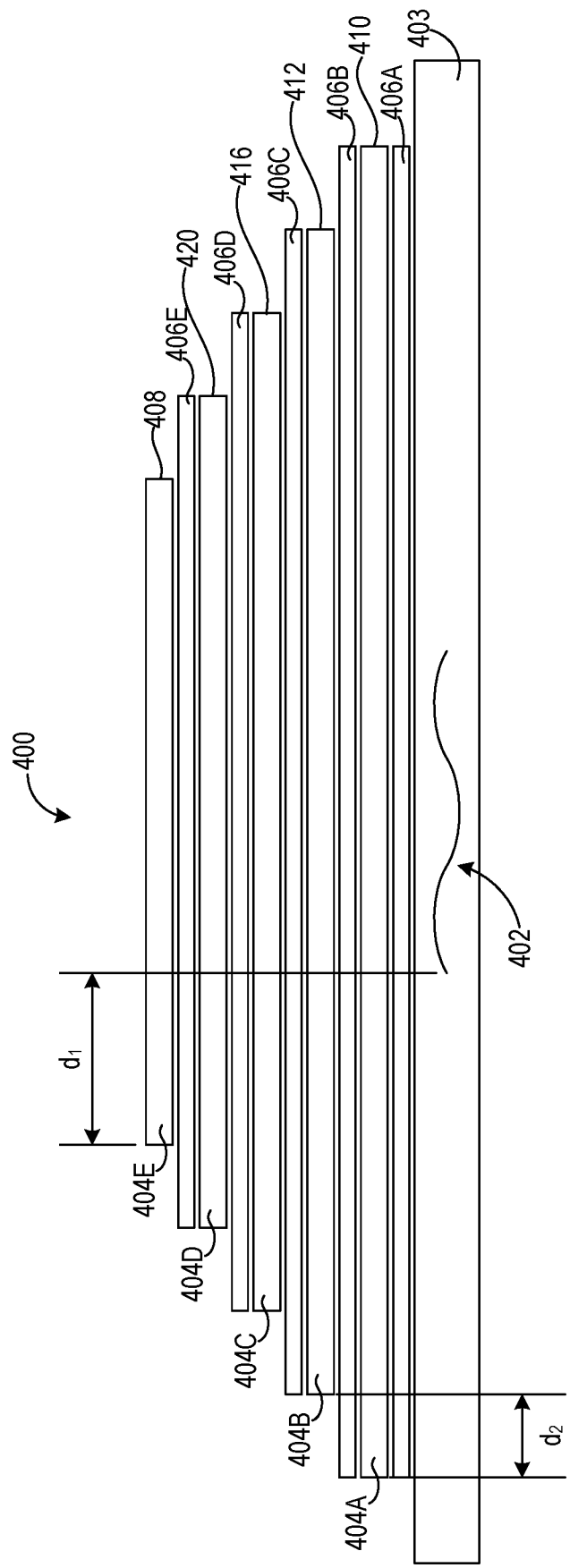
FIG. 4 shows an illustration depicting a cross-sectional view of an example rework part configured to rework a damaged area of a damaged composite structure.

FIG. 4 illustrates a cross-sectional view of an example rework part 400 configured to rework a damaged area (indicated at 402) of a composite structure 403 according to the present disclosure. In one example, rework part 400 is developed to rework damage 104 on wing 106 and includes composite layers 404 having perimeters according to outline 300 in FIGS. 2 and 3. In this example, composite structure 403 represents skin 102 and/or an underlying damaged composite structure such as a stringer. As noted above, other examples of damage that can be reworked according to the disclosed approaches include but are not limited to delamination (e.g., in multi-layer aircraft skin), surface gouges, cracks, loss of bonds between structures (e.g., between skin and stringers), etc.

Rework part 400 includes five composite layers: a bottom composite layer 404A, a first intermediate composite layer 404B, a second intermediate composite layer 404C, a third intermediate composite layer 404D, and an uppermost composite layer 404E. An adhesive layer is arranged between each adjacent pair of composite layers/structures to bond these layers/structures: a bottom adhesive layer 406A is arranged between composite structure 403 and bottom composite layer 404A, a first rework part adhesive layer 406B is arranged between the bottom composite layer 404A and first intermediate composite layer 404B, a second rework part adhesive layer 406C is arranged between the first intermediate composite layer 404B and second intermediate composite layer 404C, a third rework part adhesive layer 406D is arranged between the second intermediate composite layer 404C and third intermediate composite layer 404D, and an uppermost rework part adhesive layer 406E is arranged between third intermediate composite layer 404D and uppermost composite layer 404E. For ease of illustration, rework part 400 is shown with spaces between adjacent layers.

Composite layers 404 can be formed from any suitable composite material. As one example, each composite layer 404 can be formed from a composite material such as a resin-impregnated carbon composite. In some examples, each composite layer 404 can be formed from a pre-cured laminate—e.g., a laminate formed from two or more composite plies or lamina. The lamina can be bonded together by applying pressure and heat (e.g., via an autoclave, vacuum bagging with heat blankets, vacuum bagging with an oven), or in any other suitable manner.

As noted above, in some examples the selection of the number of composite layers for a rework part can be based at least in part on the number of plies in each composite layer of the rework part and/or on the number of damaged plies in a composite structure to be reworked or other composite structure involved in the rework. For example, if a damaged composite structure to be reworked includes six plies, and each composite layer of a rework part includes two plies of composite material, in some examples the rework part can be configured with three composite layers. Further, the material composition of composite layers can be selected based on the material composition of the composite structure to be reworked. For example, the material composition of composite layers 404 can be selected to substantially match the material composition of composite structure 403.

Adhesive layers 406 can be comprised of any suitable materials. In some examples, each adhesive layer 406 can be comprised of an adhesive material that cures at a temperature of approximately 250° F. Such adhesive materials can be considered low-temperature adhesives, which by virtue of being curable at such relatively lower temperatures, can reduce the potential for causing heat-related damage while curing adhesive layers 406, particularly where composite structure 403 includes a laminate. In other examples, each adhesive layer 406 can be comprised of an adhesive material that cures at a temperature of approximately 350° F. As adhesive materials of differing curing temperatures can be used, the rework parts described herein support a variety of adhesive materials.

As mentioned above, the design of rework part 400 includes arranging the composite layers to achieve a desired degree of overlap between layers and relative to the damaged area. In the depicted example, uppermost composite layer 404E is dimensioned such that an upper perimeter 408 of the uppermost composite layer extends beyond damaged area 402 by at least a distance di around the entire periphery of the upper perimeter. In one example, the distance di is approximately one inch or more. In some examples, distance di can be determined utilizing results of testing and analysis of composite structure 402 and/or damaged area 403 to calculate a sufficient overlap that enables restoration of the structural capability of the composite structure 403. In another depiction of such overlap and with reference again to FIG. 3, the perimeter 302 of the uppermost composite layer of the rework part extends beyond the perimeter 304 of damage 104 around the entire periphery of the perimeter 302.

Additionally and as shown in FIG. 4, in this example each of the composite layers 404A, 404B, 404C, and 404D is dimensioned such that the perimeter of that layer extends beyond the perimeter of the adjacent higher layer by at least a distance $d_2$. For example, bottom composite layer 404A is dimensioned such that its perimeter 410 extends by distance $d_2$ beyond the perimeter 412 of first intermediate composite layer 404B immediately above the bottom composite layer. In one example, the distance $d_2$ is approximately one-half inch or more.

As described above, by arranging the multiple composite layers in such a stepwise overlapping configuration, the edges of composite layers below a given composite layer are not pinched off by the given composite layer, advantageously enabling air, volatiles, and/or other substances to freely aspirate from the composite layers. In different examples, the composite layers 404 of rework part 400 can be configured with any suitable degree of overlap with damaged area 402 and between adjacent composite layers. In some examples, the amount of overlap between adjacent composite layers is substantially the same. In other examples, the amount of overlap between adjacent composite layers can vary throughout the rework part 400.

Figure 5:
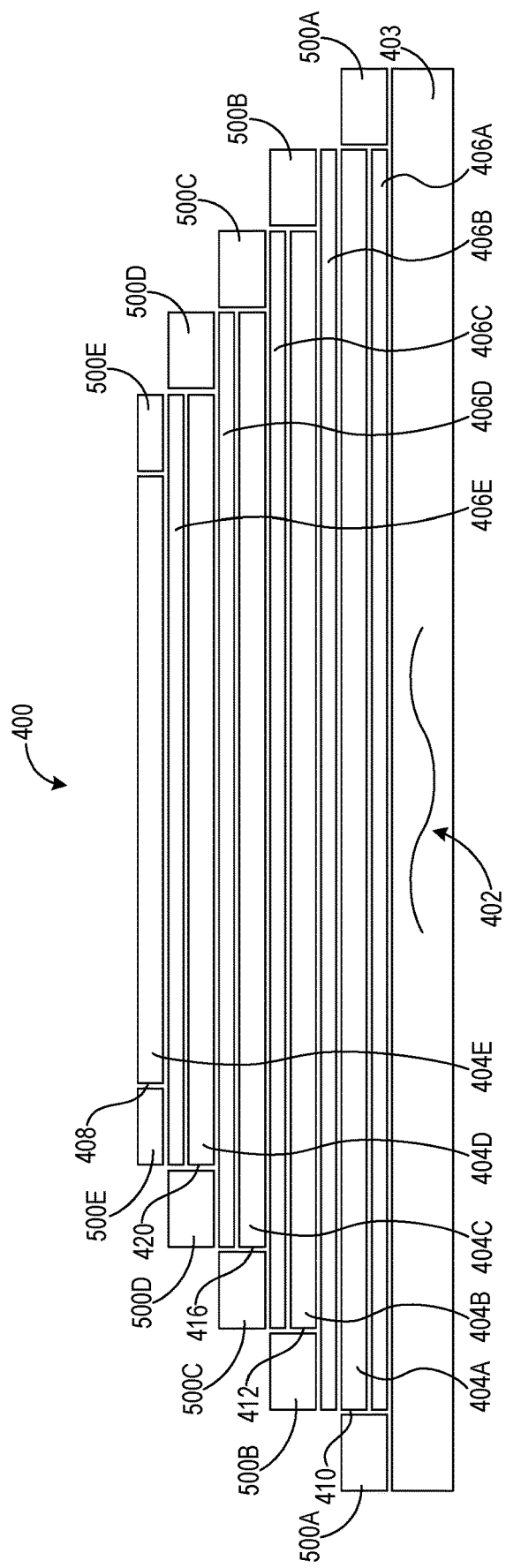
FIG. 5 shows an illustration depicting the rework part of FIG. 4 with adhesive rings.

With reference now to FIG. 5, in some examples an adhesive ring is provided around the perimeter of each composite layer in a rework part. FIG. 5 illustrates a cross-section of another configuration of rework part 400 that includes an adhesive ring encircling the perimeter of each of the composite layers: a bottom adhesive ring 500A arranged to encircle perimeter 410 of bottom composite layer 404A, a first intermediate adhesive ring 500B arranged to encircle the perimeter 412 of first intermediate composite layer 404B, a second intermediate adhesive ring 500C arranged to encircle the perimeter 416 of second intermediate composite layer 404C, a third intermediate adhesive ring 500D arranged to encircle the perimeter 420 of third intermediate composite layer 404D, and an uppermost adhesive ring 500E arranged to encircle perimeter 408 of uppermost composite layer 404E.

In the example depicted in FIG. 5, adhesive rings 500A-500D have a substantially equal thickness, which is greater than the thickness of uppermost adhesive ring 500E. In other examples, all adhesive rings 500 can be configured with a substantially equal thickness, or the thickness can vary among one or more of the adhesive rings. The depicted example also shows the upper surface of adhesive rings 500B, 500C, and 500D as being approximately aligned/flush with the top of the adjacent adhesive layer 406C, 406D, and 406E, respectively, and the lower surface of adhesive rings 500B, 500C, and 500D approximately aligned/flush with the bottom of the adjacent composite layer 404B, 404C, and 404D, respectively. In other examples, other arrangements of adhesive rings 500 relative to adjacent adhesive layers and composite layers are possible.

In some examples and as noted above, rework part 400 can be adhered to an exterior surface of an apparatus. For example, rework part 400 can be adhered to the exterior surface of an aircraft, in which case composite structure 403 can be the skin forming the exterior surface of the aircraft. In such examples, utilizing adhesive rings 500 provides a smoother and more continuous perimeter surface to rework part 400 as compared to the stepped-like edge depicted in FIG. 4. In these examples, the adhesive rings 500 can be cured to cause the adhesive material to flow and create a smoother contour around the periphery of the rework part 400. Advantageously, such a smoother contoured periphery can render the presence of the rework part 400 less conspicuous. As such, the adhesive rings 500 can provide additional desired aesthetic properties to rework part 400.

In other example use cases, adhesive rings 500 may not be utilized with rework part 400. For example, adhesive rings 500 may not be utilized where the rework part 400 is adhered to an interior surface of an apparatus, or to another surface where the presence of the rework part is not visible or unlikely to be seen from an exterior view of the apparatus or surface.

Other variations of the configuration of rework part 400 are possible. As one example, a filler material and fiberglass cover layer can be arranged above uppermost composite layer 404E to conceal the underlying layers and render the appearance of rework part 400 inconspicuous or substantially imperceptible. As yet another example, rework part 400 can include a lightning protection layer. The lightning protection layer can include an aluminum foil sandwiched between two layers of fiberglass and bonded to uppermost composite layer 404E, for example.

Figure 6:
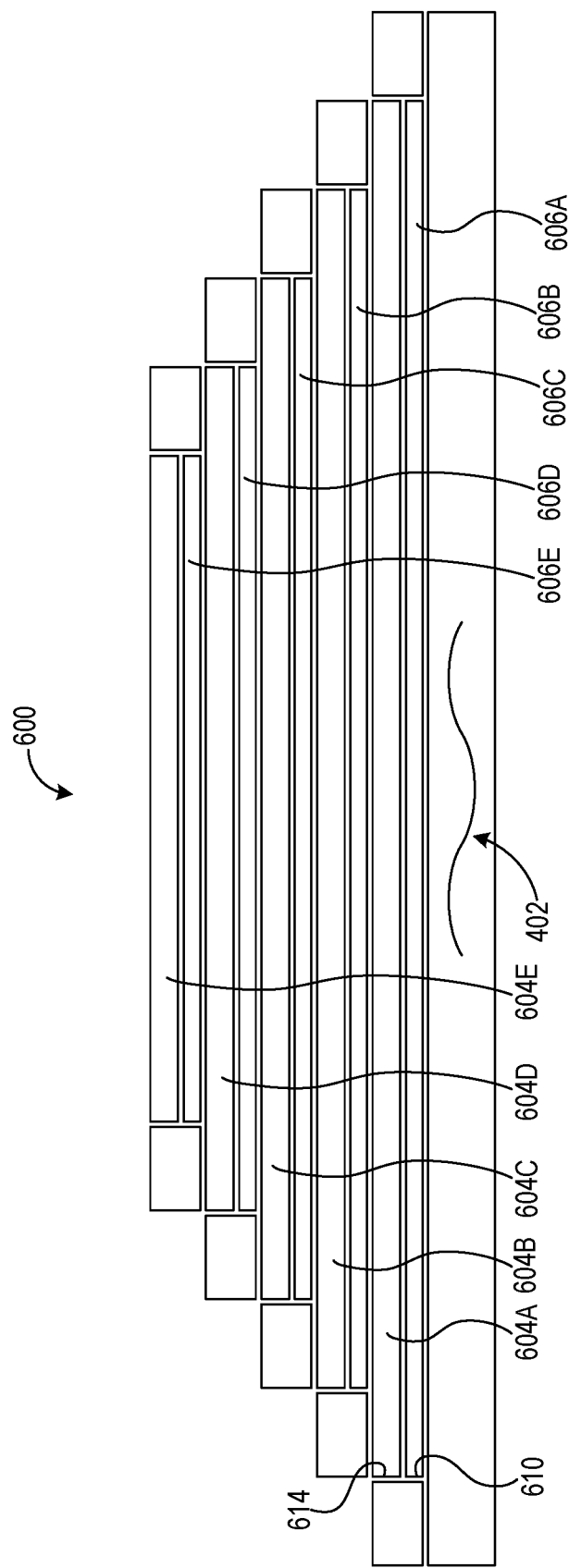
FIG. 6 shows an illustration depicting another example rework part.

In the depicted examples of FIGS. 4 and 5, each adhesive layer 406 aside from bottom adhesive layer 406A extends beyond the perimeter of the adjacent and higher composite layer 404. In other examples, the relative overlap between adhesive layers and adjacent composite layers can be varied. FIG. 6 illustrates one example of such variation, depicting a rework part 600 that includes five composite layers 604A, 604B, 604C, 604D, and 604E, and five adhesive layers 606A, 606B, 606C, 606D, and 606E. Each adhesive layer 606 has a perimeter that is substantially flush with the perimeter of the adjacent composite layer 604 on the upper side of the adhesive layer 606. For example, bottom adhesive layer 606A has a perimeter 610 that is substantially flush with a perimeter 614 of bottom composite layer 604A.

Figure 7:
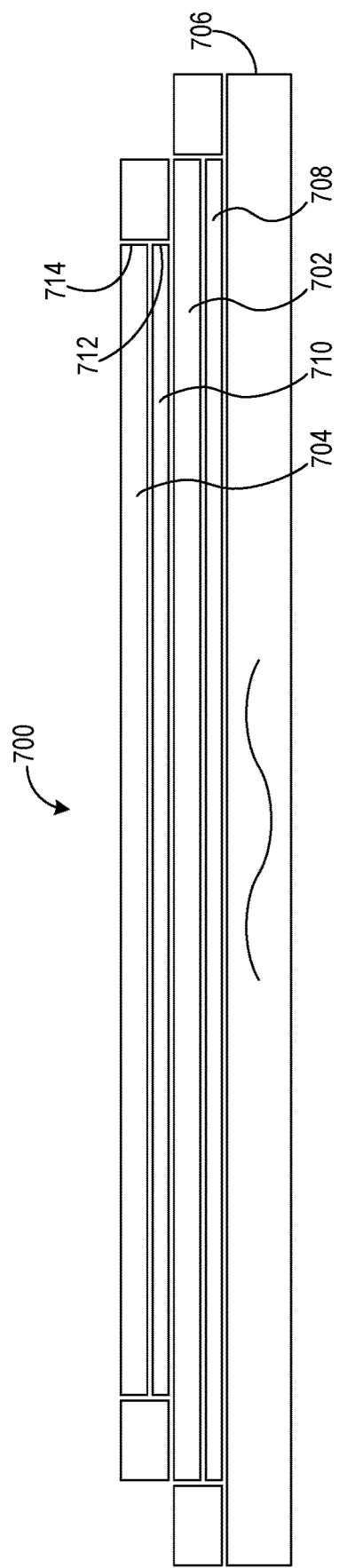
FIG. 7 shows an illustration depicting another example rework part.

As mentioned above, the number of composite layers of a rework part can be varied based on inspection of the damage, structural analysis of the damaged area, properties of the composite structure, etc. As one example, FIG. 7 illustrates a rework part 700 comprising two composite layers: a bottom composite layer 702 and an upper composite layer 704. Bottom composite layer 702 is directly adhered to a damaged composite structure 706 by a bottom adhesive layer 708, and upper composite layer 704 is bonded directly to the bottom composite layer 702 by a rework part adhesive layer 710. In this example, rework part adhesive layer 710 has a perimeter 712 that is substantially flush with a perimeter 714 of upper composite layer 704. However, the relative arrangement and dimensions among composite layers and adhesive layers can be varied as described above.

Figure 8:
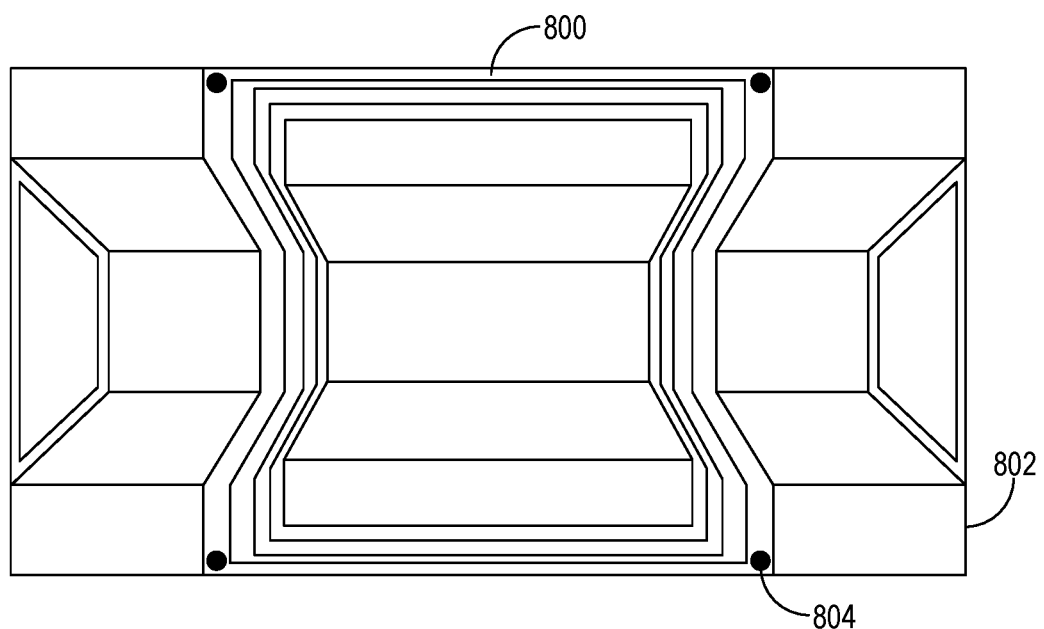
FIG. 8 shows an illustration depicting another example rework part bonded to a stringer.

As described above, rework parts according to the approaches described herein can be applied to any suitable composite structure. As another example of a composite structure to which a rework part can be applied, FIG. 8 illustrates a rework part 800 bonded to a composite stringer 802 that has undergone damage. In the area where rework part 800 is applied, stringer 802 exhibits a non-planar, U-shaped geometry. Rework part 800 is accordingly configured with a non-planar, U-shaped geometry to match the shape of the stringer 802 and achieve a desired adherence between the rework part and stringer, and thereby provide a desired rework of the damage experienced by the stringer.

FIG. 8 illustrates an example of implementations in which a rework part can be applied to composite structures having non-planar (e.g., curved, irregular) geometries in addition to composite structures having planar geometries as in the examples illustrated in FIGS. 1-7. In these implementations, the composite layers of a rework part can be pre-cured into a geometry that is based on, or in some examples substantially matches or is mated or complementary to, the composite structure to be reworked. Accordingly and in different examples, composite layers can be pre-cured during their formation into a planar geometry for planar composite structures, and into non-planar geometries for non-planar composite structures. As another example, composite layers can be pre-cured into an L-shaped geometry for an L-shaped composite structure.

Figure 9:
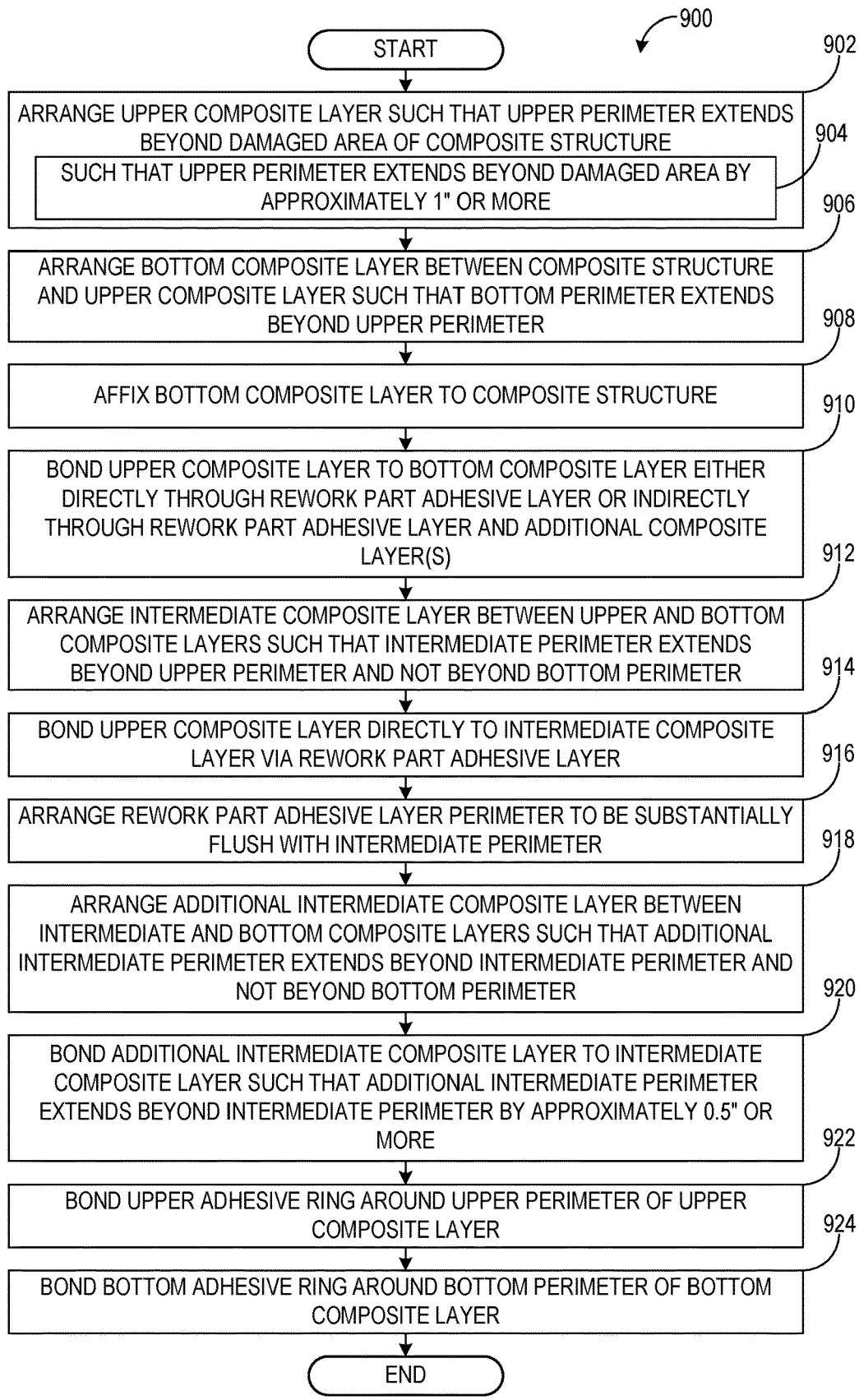
FIG. 9 shows a flowchart illustrating a method for providing a rework part for a composite structure.

With reference now to FIG. 9, a flowchart illustrating a method 900 for providing a rework part for a composite structure is presented. Method 900 may be performed to provide one or more of rework parts 400, 600, 700, and 800, for example.

At 902, method 900 includes arranging an upper composite layer such that an upper perimeter of the upper composite layer extends beyond a damaged area of the composite structure. The upper composite layer can be arranged such that the upper perimeter extends 904 beyond the damaged area by approximately one inch or more. At 906, method 900 includes arranging a bottom composite layer between the composite structure and the upper composite layer, the bottom composite layer comprising a bottom perimeter that extends beyond the upper perimeter of the upper composite layer. In some examples, each composite layer can comprise two plies of a resin-impregnated carbon composite, which can be bonded together by applying heat and pressure. At 908, method 900 includes affixing the bottom composite layer to the composite structure. In some examples, one or more of a heat source, pressure source, and vacuum source can be used to adhere the bottom composite layer to the composite structure via a bottom adhesive layer. In some examples, the adhesive layers of the rework part can be curable at approximately 250° F. In other examples, the adhesive layers of the rework part can be curable at approximately 350° F. Further, in some examples, the bottom composite layer can be affixed to the composite structure via fastener(s), alternatively or in addition to adhering the bottom composite layer to the composite structure via a bottom adhesive layer.

At 910, method 900 includes bonding the upper composite layer to the bottom composite layer either directly through a rework part adhesive layer or indirectly through the rework part adhesive layer and one or more additional composite layers. At 912, method 900 includes arranging an intermediate composite layer between the upper composite layer and the bottom composite layer, where the intermediate composite layer has an intermediate perimeter that extends beyond the upper perimeter of the upper composite layer and does not extend beyond the bottom perimeter of the bottom composite layer. At 914, method 900 includes bonding the upper composite layer directly to the intermediate composite layer via the rework part adhesive layer. At 916, method 900 includes arranging a rework part adhesive layer perimeter of the rework part adhesive layer to be substantially flush with the intermediate perimeter of the intermediate composite layer.

At 918, method 900 includes arranging an additional intermediate composite layer between the intermediate composite layer and the bottom composite layer, where the additional intermediate composite layer has an additional intermediate composite layer perimeter that extends beyond the intermediate perimeter of the intermediate composite layer and does not extend beyond the bottom perimeter of the bottom composite layer. At 920, method 900 includes bonding the additional intermediate composite layer to the intermediate composite layer, where the additional intermediate composite layer perimeter extends beyond the intermediate perimeter of the intermediate composite layer by approximately one-half inch or more. At 922, method 900 includes bonding an upper adhesive ring around the upper perimeter of the upper composite layer. At 924, method 900 includes bonding a bottom adhesive ring around the bottom perimeter of the bottom composite layer. In some examples, other layers can be incorporated in the rework part, including but not limited to a lightning protection layer or covering layer.

In some examples, the adhesive layers in the rework part can be cured, and thus the adjacent adhesive and composite layers bonded, separately from adhering the rework part to the composite structure or in a combined process. Where the bonding and adhering are carried out separately, a tooling surface separate from the composite structure, or an apparatus that includes the composite structure, can be used to cure the adhesive layers and achieve intra-layer bonding. The tooling surface can be configured with a geometry based on (e.g., substantially matching, mated or complementary to) the surface of the composite structure to which the rework part is to be applied. Following curing, the cured rework part then can be adhered to the composite structure. In other examples where the bonding and adhering are instead carried in a common process, the composite structure can be used as a surface for both curing the adhesive layers and achieving intra-layer bonding, and adhering the rework part to the composite structure. In yet other examples, a rework part can be affixed to a composite structure via bolt(s) and/or any other suitable fasteners, alternatively or in addition to adhering the rework part to the composite structure via an adhesive layer. As one example of fastening, FIG. 8 depicts four bolts (e.g., bolt 804) fastening the bottom layer of rework part 800 to composite stringer 802. As used herein, "affix" refers to adhering a rework part to a composite structure via an adhesive layer and/or to fastening a rework part to a composite structure via fastener(s).

The approaches described herein can enable damage to composite structures to be reworked in the field, potentially using the composite structure itself to bond layers of the rework part. Advantageously, the geometric configuration of the disclosed rework parts is such that the edges of layers below a given layer are not pinched off by the given layer, due to the successively decreasing areas of layers as a rework part is traversed upwardly. As such, air, volatiles, and other substances can aspirate from the disclosed rework parts without drilling a breather hole. The described approaches enable composite structure damage to be reworked using low-temperature adhesives and without removal of the damage, which can reduce the potential for further damage or unsuccessful reworks, and decrease lead time between the occurrence of damage and its repair. Using adhesive rings, a smooth edge of a rework part can be produced to provide an inconspicuous or imperceptible appearance of the rework part, thereby retaining desired aesthetic characteristics of a composite structure or apparatus. In some examples, a rework part can be implemented such that an upper composite layer is substantially flush with a surface of the composite structure adjacent to the damaged area.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

Further, the disclosure comprises configurations according to the following clauses.

Clause 1. A rework part for a composite structure, the rework part comprising an upper composite layer comprising an upper perimeter that extends beyond a damaged area of the composite structure, a bottom composite layer between the composite structure and the upper composite layer, the bottom composite layer comprising a bottom perimeter that extends beyond the upper perimeter of the upper composite layer, a bottom adhesive layer adhering the bottom composite layer to the composite structure, and a rework part adhesive layer bonding the upper composite layer to either the bottom composite layer or to an intermediate composite layer.

Clause 2. The rework part of clause 1, further comprising an upper adhesive ring encircling the upper perimeter of the upper composite layer, and a bottom adhesive ring encircling the bottom perimeter of the bottom composite layer.

Clause 3. The rework part of any of clauses 1 or 2, wherein the rework part adhesive layer bonds the upper composite layer to the intermediate composite layer, and wherein the intermediate composite layer has an intermediate perimeter that extends beyond the upper perimeter of the upper composite layer and does not extend beyond the bottom perimeter of the bottom composite layer.

Clause 4. The rework part of clause 3, wherein the rework part adhesive layer has a rework part adhesive layer perimeter that is substantially flush with the intermediate perimeter of the intermediate composite layer.

Clause 5. The rework part of any of clauses 1-4, wherein the rework part adhesive layer has a rework part adhesive layer perimeter that is substantially flush with the upper perimeter of the upper composite layer.

Clause 6. The rework part of clause 3, further comprising an additional intermediate composite layer between the intermediate composite layer and the bottom composite layer, wherein the additional intermediate composite layer has an additional intermediate composite layer perimeter that extends beyond the intermediate perimeter of the intermediate composite layer and does not extend beyond the bottom perimeter of the bottom composite layer.

Clause 7. The rework part of clause 6, wherein the additional intermediate composite layer is bonded to the intermediate composite layer, and the additional intermediate composite layer perimeter extends beyond the intermediate perimeter of the intermediate composite layer by approximately one half inch or more.

Clause 8. The rework part of any of clauses 1-7, wherein the upper composite layer is an uppermost composite layer of the rework part, and the upper perimeter of the uppermost composite layer extends beyond the damaged area by approximately one inch or more.

Clause 9. The rework part of any of clauses 1-8, wherein each of the upper composite layer and the bottom composite layer comprises two plies of a resin-impregnated carbon composite.

Clause 10. A method for providing a rework part for a composite structure, the method comprising arranging an upper composite layer such that an upper perimeter of the upper composite layer extends beyond a damaged area of the composite structure, arranging a bottom composite layer between the composite structure and the upper composite layer, the bottom composite layer comprising a bottom perimeter that extends beyond the upper perimeter of the upper composite layer, affixing the bottom composite layer to the composite structure, and bonding the upper composite layer to the bottom composite layer either directly through a rework part adhesive layer or indirectly through the rework part adhesive layer and one or more additional composite layers.

Clause 11. The method of clause 10, further comprising bonding an upper adhesive ring around the upper perimeter of the upper composite layer, and bonding a bottom adhesive ring around the bottom perimeter of the bottom composite layer.

Clause 12. The method of any of clauses 10 or 11, further comprising arranging an intermediate composite layer between the upper composite layer and the bottom composite layer, wherein the intermediate composite layer has an intermediate perimeter that extends beyond the upper perimeter of the upper composite layer and does not extend beyond the bottom perimeter of the bottom composite layer.

Clause 13. The method of clause 12, further comprising bonding the upper composite layer directly to the intermediate composite layer via the rework part adhesive layer.

Clause 14. The method of clause 13, wherein the rework part adhesive layer has a rework part adhesive layer perimeter, the method further comprising arranging the rework part adhesive layer perimeter to be substantially flush with the intermediate perimeter of the intermediate composite layer.

Clause 15. The method of clause 13, wherein the rework part adhesive layer has a rework part adhesive layer perimeter, the method further comprising arranging the rework part adhesive layer perimeter to be substantially flush with the upper perimeter of the upper composite layer.

Clause 16. The method of clause 12, further comprising arranging an additional intermediate composite layer between the intermediate composite layer and the bottom composite layer, wherein the additional intermediate composite layer has an additional intermediate composite layer perimeter that extends beyond the intermediate perimeter of the intermediate composite layer and does not extend beyond the bottom perimeter of the bottom composite layer.

Clause 17. The method of clause 16, further comprising bonding the additional intermediate composite layer to the intermediate composite layer, wherein the additional intermediate composite layer perimeter extends beyond the intermediate perimeter of the intermediate composite layer by approximately one half inch or more.

Clause 18. The method of any of clauses 10-17, wherein the upper composite layer is an uppermost composite layer of the rework part, and the upper perimeter of the uppermost composite layer extends beyond the damaged area by approximately one inch or more.

Clause 19. A rework part for a composite structure, the rework part comprising an upper composite layer comprising an upper perimeter that extends beyond a damaged area of the composite structure, a bottom composite layer between the damaged composite structure and the upper composite layer, the bottom composite layer adhered to the composite structure and comprising a bottom perimeter that extends beyond the upper perimeter of the upper composite layer, and an intermediate composite layer between the upper composite layer and the bottom composite layer, wherein the intermediate composite layer has an intermediate perimeter that extends beyond the upper perimeter of the upper composite layer and does not extend beyond the bottom perimeter of the bottom composite layer.

Clause 20. The rework part of clause 19, further comprising an upper adhesive ring encircling the upper perimeter of the upper composite layer, and a bottom adhesive ring encircling the bottom perimeter of the bottom composite layer.

The invention claimed is:

1. A rework part for a composite structure, the rework part comprising:
    an upper composite layer comprising an upper perimeter that extends beyond a damaged area of the composite structure;
    a bottom composite layer between the composite structure and the upper composite layer, the bottom composite layer comprising a bottom perimeter that extends beyond the upper perimeter of the upper composite layer;
    a bottom adhesive layer adhering the bottom composite layer to the composite structure;
    a rework part adhesive layer bonding the upper composite layer to either the bottom composite layer or to an intermediate composite layer;
    an upper adhesive ring encircling and laterally adjacent to the upper perimeter of the upper composite layer; and
    a bottom adhesive ring encircling and laterally adjacent to the bottom perimeter of the bottom composite layer.

2. The rework part of claim 1, wherein the rework part adhesive layer bonds the upper composite layer to the intermediate composite layer, and wherein the intermediate composite layer has an intermediate perimeter that extends beyond the upper perimeter of the upper composite layer and does not extend beyond the bottom perimeter of the bottom composite layer.

3. The rework part of claim 2, wherein the rework part adhesive layer has a rework part adhesive layer perimeter that is substantially flush with the intermediate perimeter of the intermediate composite layer.

4. The rework part of claim 2, wherein the rework part adhesive layer has a rework part adhesive layer perimeter that is substantially flush with the upper perimeter of the upper composite layer.

5. The rework part of claim 2, further comprising an additional intermediate composite layer between the intermediate composite layer and the bottom composite layer, wherein the additional intermediate composite layer has an additional intermediate composite layer perimeter that extends beyond the intermediate perimeter of the intermediate composite layer and does not extend beyond the bottom perimeter of the bottom composite layer.

6. The rework part of claim 5, wherein the additional intermediate composite layer is bonded to the intermediate composite layer, and the additional intermediate composite layer perimeter extends beyond the intermediate perimeter of the intermediate composite layer by approximately one half inch or more.

7. The rework part of claim 1, wherein the upper composite layer is an uppermost composite layer of the rework part, and the upper perimeter of the uppermost composite layer extends beyond the damaged area by approximately one inch or more.

8. The rework part of claim 1, wherein each of the upper composite layer and the bottom composite layer comprises two plies of a resin-impregnated carbon composite.

9. A method for providing a rework part for a composite structure, the method comprising:
    arranging an upper composite layer such that an upper perimeter of the upper composite layer extends beyond a damaged area of the composite structure;
    arranging a bottom composite layer between the composite structure and the upper composite layer, the bottom composite layer comprising a bottom perimeter that extends beyond the upper perimeter of the upper composite layer;
    affixing the bottom composite layer to the composite structure;
    bonding the upper composite layer to the bottom composite layer either directly through a rework part adhesive layer or indirectly through the rework part adhesive layer and one or more additional composite layers;
    bonding an upper adhesive ring around the upper perimeter of the upper composite layer, the upper adhesive ring encircling and laterally adjacent to the upper perimeter; and bonding a bottom adhesive ring around the bottom perimeter of the bottom composite layer, the bottom adhesive ring encircling and laterally adjacent to the bottom perimeter.

10. The method of claim 9, further comprising:
arranging an intermediate composite layer between the upper composite layer and the bottom composite layer, wherein the intermediate composite layer has an intermediate perimeter that extends beyond the upper perimeter of the upper composite layer and does not extend beyond the bottom perimeter of the bottom composite layer.

11. The method of claim 10, further comprising bonding the upper composite layer directly to the intermediate composite layer via the rework part adhesive layer.

12. The method of claim 11, wherein the rework part adhesive layer has a rework part adhesive layer perimeter, the method further comprising arranging the rework part adhesive layer perimeter to be substantially flush with the intermediate perimeter of the intermediate composite layer.

13. The method of claim 11, wherein the rework part adhesive layer has a rework part adhesive layer perimeter, the method further comprising arranging the rework part adhesive layer perimeter to be substantially flush with the upper perimeter of the upper composite layer.

14. The method of claim 10, further comprising:
arranging an additional intermediate composite layer between the intermediate composite layer and the bottom composite layer, wherein the additional intermediate composite layer has an additional intermediate composite layer perimeter that extends beyond the intermediate perimeter of the intermediate composite layer and does not extend beyond the bottom perimeter of the bottom composite layer.

15. The method of claim 14, further comprising bonding the additional intermediate composite layer to the intermediate composite layer, wherein the additional intermediate composite layer perimeter extends beyond the intermediate perimeter of the intermediate composite layer by approximately one half inch or more.

16. The method of claim 9, wherein the upper composite layer is an uppermost composite layer of the rework part, and the upper perimeter of the uppermost composite layer extends beyond the damaged area by approximately one inch or more.

17. A rework part for a composite structure, the rework part comprising:
an upper composite layer comprising an upper perimeter that extends beyond a damaged area of the composite structure;
a bottom composite layer between the damaged composite structure and the upper composite layer, the bottom composite layer affixed to the composite structure and comprising a bottom perimeter that extends beyond the upper perimeter of the upper composite layer;
an intermediate composite layer between the upper composite layer and the bottom composite layer, wherein the intermediate composite layer has an intermediate perimeter that extends beyond the upper perimeter of the upper composite layer and does not extend beyond the bottom perimeter of the bottom composite layer;
an upper adhesive ring encircling and laterally adjacent to the upper perimeter of the upper composite layer;
an intermediate adhesive ring encircling and laterally adjacent to the intermediate perimeter of the intermediate composite layer; and
a bottom adhesive ring encircling and laterally adjacent to the bottom perimeter of the bottom composite layer.

18. The rework part of claim 17, further comprising a rework part adhesive layer bonding the upper composite layer to the intermediate composite layer, wherein the rework part adhesive layer has a rework part adhesive layer perimeter that is substantially flush with the intermediate perimeter of the intermediate composite layer.

19. The rework part of claim 17, further comprising a rework part adhesive layer bonding the upper composite layer to the intermediate composite layer, wherein the rework part adhesive layer has a rework part adhesive layer perimeter that is substantially flush with the upper perimeter of the upper composite layer.

20. The rework part of claim 17, further comprising an additional intermediate composite layer between the intermediate composite layer and the bottom composite layer, wherein the additional intermediate composite layer has an additional intermediate composite layer perimeter that extends beyond the intermediate perimeter of the intermediate composite layer and does not extend beyond the bottom perimeter of the bottom composite layer.

* * * * *